US012775580B1

(12) United States Patent
Blume et al.

(10) Patent No.: US 12,775,580 B1
(45) Date of Patent: Oct. 27, 2026

(54) DISTRIBUTED CO-LOCATING MESSAGING METHOD AND SYSTEM USING BETA-EPSILON-TREES ON SOLID-STATE STORAGE AND RDMA FOR INTER-NODE COMMUNICATION

(71) Applicant: DATA DIRECT NETWORKS, INC., Chatsworth, CA (US)

(72) Inventors: Christian Blume, Aukland (NZ); Nikita Danilov, San Francisco, CA (US); Eric Edward Barton, Bristol (GB)

(73) Assignee: Data Direct Networks, Inc., Chatsworth, CA (US)

( * ) Notice: Subject to any disclaimer, the term of this patent is extended or adjusted under 35 U.S.C. 154(b) by 0 days.

(21) Appl. No.: 19/221,104

(22) Filed: May 28, 2025

(51) Int. Cl.
*G06F 16/11* (2019.01)
*G06F 15/173* (2006.01)
*H04L 5/00* (2006.01)

(52) U.S. Cl.
CPC ...... *G06F 16/119* (2019.01); *G06F 15/17331* (2013.01); *H04L 5/0044* (2013.01)

(58) Field of Classification Search
CPC . G06F 16/119; G06F 15/17331; H04L 5/0044
See application file for complete search history.

(56) References Cited

U.S. PATENT DOCUMENTS 10,725,963 B2 * 7/2020 Suzue ............... G06F 15/17331
11,093,471 B2 * 8/2021 Gupta ....................... G06F 7/16
11,354,288 B2 * 6/2022 Gupta ..................... G06F 16/17
12,475,127 B1 * 11/2025 Subrahmanyan ... G06F 16/2358
2017/0149890 A1 * 5/2017 Shamis ............... H04L 67/1097
2020/0233801 A1 * 7/2020 Gupta ................. G06F 16/9027
2023/0237029 A1 * 7/2023 Tal ........................ G06F 16/215 707/692
2024/0256510 A1 * 8/2024 Ben David ........... G06F 16/182
2024/0330263 A1 * 10/2024 Jarvis .................... G06F 3/0604

FOREIGN PATENT DOCUMENTS

CN 108140009 A * 6/2018 ......... H04L 67/1097
WO WO-2012154658 A2 * 11/2012 ............. G06F 21/53

* cited by examiner

*Primary Examiner* — Mark E Hershley
(74) *Attorney, Agent, or Firm* — Rosenberg, Klein & Lee

(57) ABSTRACT

Migration of messages in a distributed data storage system between compute nodes via RDMA-capable networking technology is supported by a messaging system configured with Producers replicating messages to a specified data storage layout and publishing messages with assigned time stamps to a fast storage queue in a Bε-tree format and Consumers registered to the queue to retrieve messages therefrom. Push notifications indicating availability of new messages in the queue are transmitted to intended Consumers. Upon retrieval and processing of the messages, time-stamp acknowledgements are sent out from the Consumers to Brokers.

20 Claims, 10 Drawing Sheets

DISTRIBUTED CO-LOCATING MESSAGING METHOD AND SYSTEM USING BETA-EPSILON-TREES ON SOLID-STATE STORAGE AND RDMA FOR INTER-NODE COMMUNICATION

FIELD OF THE INVENTION

The present invention is directed to data (messages) migration between high performance computing architectures (also referred to herein as data generating entities) and data storage media (also referred to herein as server nodes, storage nodes, peer nodes, or compute nodes).

In particular, the present invention addresses a technique for data migration between compute nodes in a distributed data storage system, where messaging between compute nodes (as well as between data generating entities) is supported by a distributed messaging system built upon an array of compute nodes that are directly connected via RDMA (Remote Direct memory Access)—capable networking technology.

More in particular, the present invention is directed to a highly efficient messaging sub-system incorporated in a Distributed Data Migration/Storage System (also referred to herein as a Distributed Data Storage System) composed of a plurality of data storage clusters, where each data storage cluster includes numerous compute nodes with each compute node having an exclusive access to a number of storage devices, also referred to herein as Solid-State Drives (SSDs), and where the messaging sub-system includes at least one Producer Processor Unit which is configured to publish messages to a fast solid-state storage (also referred to herein as a queue), in which messages are organized in a Bε-tree for an efficient access to each message.

Further, the present invention is directed to a distributed messaging sub-system integrated within a data storage cluster in the distributed data storage system, where the distributed messaging sub-system is configured to run Producer Processing Units (also referred to as Producers), Storage Daemon (SD) Processor Units (also referred to herein as Storage Daemons, or SDs), Broker Processor Units (also referred to herein as Brokers), and Consumer Processing Units (also referred to herein as Consumers), as part of the same messaging process (while the out-of-process messaging operation is also supported), and where the Producer controls how published messages are laid out across the array of compute nodes, thus supporting the co-location of messages with Consumers and other data necessary for efficient computations.

The present invention is also directed to a messaging sub-system distributed within a data storage cluster in the distributed data storage system, where a Producer Processor Unit defines how messages are laid out across an array of compute nodes, and where, depending on the selected message layout, messages are efficiently replicated across compute nodes using RDMA-capable networking technology.

Furthermore, the subject invention addresses a highly efficient messaging sub-system capable of attaining a combination of co-location of messages with Consumers, the efficient messages storage, and low-latency communication between compute nodes, where the messaging sub-system supports notifications and retrieving back acknowledged timestamps for messages delivered to Consumers.

Additionally, the present invention is directed to a messaging sub-system incorporated in a distributed data storage system (such as, for example, Infinia data storage system), where the Infinia cluster's messaging system uses RDMA-capable networking technology for inter-node communication.

The present invention is further directed to a messaging sub-system within an Infinia cluster which is built with a number of compute nodes, where each compute node runs a Storage Daemon (SD) Processor Unit which manages access to Solid State Drives (SSDs) and stores data/messages in a Bε-tree, where the messaging sub-system runs a Broker Processor Unit on each compute node which receives messages from the Producer Processor Unit and forwards them to the Storage Daemon Processor Unit, and where the Broker Processor Unit in each compute node also receives new messages from the Storage Daemon Processor unit and dispatches them to registered Consumers.

The present invention also addresses a messaging subsystem in the distributed data storage system (for example, Infinia distributed data storage system), where each compute node in a data storage cluster runs a Storage Daemon (SD) which is responsible for replicating messages across a set of SSDs (where each set of SSDs is also referred to as a partition, or layout), and where for each partition, the participating SSDs are distributed across the data storage cluster, so as to maximize resiliency and to minimize potential for data loss.

In addition, the present invention is directed to a messaging sub-system, as well as a messaging process, using the concept of a queue (also referred to herein as a topic, or a channel, or a fast storage) to denote a container of messages, and where the queue operates based on the First-In-First-Out (FIFO) principles and is created either by the cluster or a client coupled to or running on the Infinia cluster at an initial stage of the messaging routine, which subsequently allows for the following operations supported by the present messaging sub-system:

(a) a Consumer group (i.e., a collection of Consumers) can be attached (registered) to the created queue, where it is guaranteed that at least one Consumer from the Consumer Group can receive the message published to the queue. In case of multiple Consumers of a Group per queue and partition, the Consumers collaborate fairly in the consumption of messages (meaning that, on average, each Consumer receives the same number of messages);

b) a Consumer group can be detached from a queue. This operation removes the association to the queue and deletes all Consumer group data;

c) a message in the form of the arbitrary binary data can be published to the queue at a specific partition;

d) a range of messages can be fetched (retrieved) from the queue and a specific partition given a timestamp (where the timestamp is a monotonically increasing integer that is unique per partition to fetch from) and the maximum number of messages to expect;

e) the routine of retrieval of messages from the queue is conducted in accordance with the FIFO principles. The messages retrieval can be acknowledged per Customer group and partition given a timestamp. After the acknowledgement, the Consumer group will not receive any messages that are older than or equal to the acknowledgement timestamp; and f) the queue can be deleted. Deletion of the queue causes deletion of all associated Consumer groups, messages, and acknowledgements.

Further, the present invention is directed to a messaging sub-system, where a message can be published to a specific partition (also referred to herein as a layout), where the partition consists of M drives (Solid State Drives), with each Solid State Drive associated with a predetermined compute node. The partition is supported by N compute cores, where N<M, and where one of the N compute cores is named the primary core of the partition. The messaging sub-system will only permit the retrieval of the messages to Consumers that are registered in the primary core. Hence, if a Producer is aware of a specific Consumer registered on the primary core P, then the Producer can publish a message to the partition that has the primary core P. This approach allows for a highly efficient messaging routine which permits the Producers to co-locate messages with Consumers, thus avoiding additional networking.

BACKGROUND OF THE INVENTION

Computer clusters, or groups of linked computers, have been widely used to improve performance over that provided by a single computer, especially in extended computations. Conventionally, compute nodes are linked in a computer cluster by a high-speed network which permits sharing of computer resources and memory.

Data transfers to or from, as well as between, the compute nodes, are performed through the high speed network and are managed by additional computer devices, also referred to as file servers. The file servers file data from multiple compute nodes and assign a unique location for each compute node in the overall file system. Typically, the data migrates from the file servers to be stored on a media, such as, for example, common disk drives arranged in storage disk arrays, or solid state storage devices for storage and retrieval of large amounts of data. Arrays of solid state storage devices, such as flash memory, phase charge memory, memristors, or other non-volatile storage units, are also broadly used in data storage systems.

Having extensive data transfer traffic, a data migrating system requires a highly scalable approach to achieve improved bandwidth, lower average latency, and reliability. Typically, these parameters tend to be attained through installation of interfaces with larger bandwidths.

Nowadays, numerous messaging systems in data storage systems are available including Apache Kafka, Amazon Kinesis, Apache Pulsar, Redqueue, Apache Active MQ, IBM MQ, Google Cloud, Amazon SQS, RedPanda, etc., all offering features like distributed messaging, high throughput and scalability. Each of the messaging systems has its own strengths and uses depending on the specific requirements of a particular application.

For example, the messaging system, such as the Apache Kafka (also referred to herein as Kafka), is a distributed event store and stream-processing platform written in Java and Scala, which is developed by Apache Software Foundation. The system aims to provide a unified high-throughput and low latency platform for handling real-time data feeds. Kafka can connect to external systems (for data input-export) via Kafka connect, and provides a Kafka streams library for stream processing applications. Kafka uses a binary TCP-based communication protocol that is optimized for efficiency and relies on a message set "abstraction that naturally groups messages together to reduce the overhead of the network around trip". This leads to larger network packets, larger sequential disk operations, and contiguous memory blocks, which allows Kafka to turn a burst stream of random message writes into linear writes.

Kafka stores key-value messages that come from arbitrary processes, called Producers. The data can be partitioned into different "partitions" with different "topics". The architecture of the Kafka storage system is shown in FIG. 1. Within a partition, messages are strictly ordered by their offsets (the position of a message within a partition) and indexed and stored together with a time stamp. Other processes, called Consumers, can read messages from partitions. For stream processing, Kafka offers streams API that allows writing Java applications that consume data from Kafka and write results back to Kafka.

Kafka runs on a cluster of one or more servers (called Brokers), and the partitions of all topics are distributed across the cluster nodes. Additionally, partitions are replicated to multiple Brokers. This architecture allows Kafka to deliver streams of messages in a fault-tolerant fashion and has allowed it to replace some of the conventional messaging systems such as Java message servers (JMS), Advanced Message Queuing Protocol (AMQP), etc.

Even though it has certain advantages and widespread use in the distributed data storage systems, the Apache Kafka messaging system however is not free from shortcomings which include:

a) Kafka does not support push notifications when a new message is available for a registered Consumer;

b) Kafka does not support retrieving back acknowledged timestamps for Consumers;

c) Kafka does not support the RDMA-capable networking technology for communication between compute nodes, but relies solely on TCP/IP which results in a reduced efficiency in data migration between compute nodes; and d) in Kafka, the Producer, Broker, and Consumer cannot run as part of the same messaging process.

It is therefore highly desirable to provide a novel messaging sub-system which would overcome the prior art messaging system's disadvantages by supporting push notifications when a new message is available for being delivered to Consumers, by retrieving the acknowledged timestamps for a given Consumer group, by utilization of the RDMA-capable networking as the inter-node communication technology (for example, in the Infinia cluster), and by running the Producer, Broker, and Consumer as part of the same process, while also supporting the out-of-process operation.

SUMMARY OF THE INVENTION

It is therefore an objective of the present invention to provide a distributed messaging sub-system built upon an array of compute nodes that are directly connected via the RDMA-capable networking technology for inter-node communication to increase the efficiency in data replication between compute nodes within the cluster, and where each compute node has an exclusive access to predetermined Solid State Drives.

It is another objective of the present invention to provide a distributed messaging sub-system, which includes Producers operating to publish messages to fast solid state storage (also referred to herein as a queue, or a FIFO queue) in which messages are organized in a Bε-tree for efficient access.

It is a further objective of the present invention to provide a messaging sub-system incorporated in a distributed data storage system, where each Processor is configured to control how messages are laid out across the array of Compute nodes and can therefore co-locate messages with Consumers and other data necessary for efficient computations, and where, depending on the selected message layout, messages are efficiently replicated across Compute nodes using RDMA-capable networking technology for the inter-node communication.

It is yet another objective of the present invention to provide a distributed messaging system attaining a highly efficient messaging process by the combination of a co-location of messages with Consumers, efficient storage, and low latency communication between the Compute nodes via the RDMA-capable networking technology.

It is a still an objective of the present invention to provide a distributed messaging sub-system which supports the push notifications, when new messages are available for being delivered to Consumers, and capable of retrieving back acknowledged time stamps for a given Consumer group.

It is another objective of the present invention to provide a distributed messaging sub-system, which can run the Producers, Brokers, and Consumers as part of the same process or, alternatively, as an out-of-process operation.

In one aspect, the present invention constitutes a method for migrating messages in a distributed data storage system configured with an array of compute nodes arranged in at least one cluster of compute nodes, a plurality of RDMA-supported communication channels for interconnecting the compute nodes in their array, a messaging sub-system embedded in the cluster in operative coupling with and distributed among the compute, and a plurality of storage devices, wherein each compute node in their array has an exclusive access to a predetermined layout of data storage devices.

The messaging sub-system includes at least one Producer Processor Unit configured to generate and publish at least one message to a fast data storage (also referred to herein as a queue, or a FIFO queue), and at least one Consumer Processor Unit (also referred to herein as a Consumer) operatively coupled (registered) to the fast data storage (queue) to receive the message therefrom. Each compute node includes, incorporated therein, a Storage Daemon (SD) Processor Unit and a Broker Processor Unit operatively coupled between the Producer Processor Unit and the Consumer Processor Unit. A Consumer group of a plurality of the Consumer Processor Units may be registered to the queue. The Consumer group is active when at least one Consumer Processor Unit is active.

The subject messaging method is supported by the messaging sub-system and includes the steps of:

generating at least one message by at least one Producer Processor Unit (also referred to herein as a Producer), where the generated message includes a binary payload and a predetermined layout of data storage devices having a predetermined number and location of data storage devices, and the queue name and location. The generated message is submitted from the Producer to at least one compute node of the array of compute nodes (which may be referred herein as a primary node, or an initiating node).

At the initiating compute node, the subject messaging process continues by the routine of forwarding the message from the Producer to the Broker Processor Unit (also referred to herein as a Broker), which publishes the message to the Storage Daemon (SD) Processor Unit (also referred to herein as a SD), replicating, by the SD, the message received at the SD across the predetermined layout of data storage devices, and publishing the message in the queue in the Bε-tree format. Upon the replication routine has been accomplished and the message has been published in the queue, the Broker on the primary node is notified and dispatches the message to the attached (registered) Consumer groups. In the process, a target Consumer is notified (through a push notification) that a new message is available to the Consumer for retrieval.

In the present method, the message delivery to the intended Consumer is temporally decoupled from the message generation by the Producer. A Consumer can join ("attach to") the queue at a later point in time and receive all the messages from the latest timestamp the Consumer acknowledged previously. Produced, but still un-acknowledged, messages are stored in the Bε-tree.

Upon delivery of the message(s) to the Consumer(s), the Consumer(s) acknowledge(s) the receipt of the message(s) from the queue. For this, the system (particularly, the Consumer Processor Unit) issues an acknowledging message for the logical clock timestamp of the message upon delivering the message to the Consumer Processor Unit.

The logical clock timestamp is assigned by the Broker Processor Unit to the message, when the message is published in the queue. The message is delivered from the queue to the Consumer subsequent to delivering other messages contained in the queue having logical clock timestamps preceding the logical clock timestamp of the message in question. The Broker does not need to wait for messages to be acknowledged until new messages are dispatched.

The message is considered to be delivered when an acknowledgement message from the Consumer is received at the Broker. The acknowledgement message (also referred to herein as to the "Message receipt Acknowledgement/Acknowledged timestamp") is transmitted from the Consumer in question to the initiating compute node, and/or to the Broker.

The Producer Processor Unit and the Consumer Processor Unit run within the cluster of compute nodes, or, alternatively, the Producer Processor Unit and the Consumer Processor Unit can run on client node(s). A Client is referred to herein as a process that can connect to the cluster, send requests, and receive responses via the network. The Client processes can run on the cluster's compute nodes or on stand-alone nodes. The Client is also configured to create a queue, meaning that the Client creates a queue metadata entry on the cluster. The Client can run any number of Producers or Consumers.

For the embodiment, when the Producer Processor Unit and the Consumer Processor Unit run on client node(s), the subject method further includes the following operations: operatively coupling the first client node to the Producer Processor Unit, operatively coupling a second client node to the Consumer Processor Unit, generating the message by the Producer Processor Unit, publishing the message to the queue created by the first client, coupling the Consumer Processor Unit to the queue, and retrieving the message to the Consumer Processor Unit running on the second client node.

Fast data storage is also referred to herein as a queue of partially ordered messages, where the Consumer Processor Unit retrieves the message from the queue according to a delivery guarantee which may be in the format of an acknowledgement message.

Subsequent to the message delivery to the Consumer Processor unit, registration to the queue may be closed by an entity which created the queue. The queue is not necessarily deleted immediately upon the acknowledgement messages are issued and/or received. Instead, the messaging sub-system has the feature of retention (deadline), where the acknowledged messages are eventually deleted by the Broker once they reach a certain age (defined at the creation time of the queue in question).

In the subject method, upon creation, the queue is assigned a queue deadline attribute, where the message is active until it is published in the queue for longer than the duration of the queue deadline attribute.

The array of compute nodes is arranged with at least one initiating compute node for transmitting the message(s) and at least one target (receiving) compute node for receiving the message(s). At least one first interface is embedded in the initiating compute node and at least one second interface is embedded in the target compute node. In the subject messaging routine, the first interface and the second interface are operatively coupled by at least one RDMA-based communication channel for transmitting messages therebetween.

The first interface and the second interface may include an interface selected from a group consisting of (a) an attached interface configured to provide access to the queue, (b) a simple interface configured as a library associated with the attached interface to provide function-call entry points, and (c) redqfs interface configured to provide access to the queue via a Linux FUSE file system.

In another aspect, the present invention constitutes a distributed data storage system supporting migration of messages. The subject system includes an array of compute nodes arranged in at least one cluster of compute nodes, a plurality of RDMA-supported communication channels for interconnecting the compute nodes in the array, a messaging sub-system integrated in the cluster in an operative coupling with and distributed among the compute nodes, and a plurality of storage devices distributed across the array of compute nodes, where each compute node has an exclusive access to a predetermined layout of data storage devices. The subject system also includes one or a number of Client Processor Unit(s), also referred to herein as Client(s). The Client is referred to herein as a process that can connect to the cluster, to send requests, and receive responses via the network. The Client can run on cluster's Compute nodes or on standalone nodes.

The messaging sub-system includes at least one Producer Processor Unit (also referred to herein as a Producer) configured to produce and publish at least one message to a fast data storage (also referred to herein as a queue, or FIFO queue), and at least one Consumer Processor Unit (also referred to herein as a Consumer) operatively coupled to the queue to receive at least one message therefrom. One of the Client's function may be the creation of a queue for one or a number of Producer(s) and/or Consumer(s). In the present system, the Producer Processor Unit and the Consumer Processor Unit run within the same cluster of compute nodes, or, alternatively, may run on client nodes.

Each compute node includes, incorporated therein, a Storage Daemon (SD) Processor Unit (also referred to herein as an SD) and a Broker Processor Unit (also referred to herein as a Broker) operatively coupled between the Producer Processor Unit and the Consumer Processor Unit.

The subject system is configured to generate at least one message by the Producer. Alternatively, the messages may be generated by the Client nodes.

The message, as generated, includes a binary payload, a predetermined layout of data storage devices having a predetermined number and location of data storage devices, and the queue name and location. The message is to be transmitted to another entity, such as the Consumer, or the Client.

For supporting the messaging protocol, the subject system is configured to transmit the generated message to an initiating compute node of the array of compute nodes, where the generated message is received by the Broker Processor Unit. At the initiating compute node, the message received by the Broker Processor Unit, is forwarded to the SD Processor Unit which replicates the received message across the predetermined layout of data storage devices, and publishes the message in the queue in the Bε-tree format.

The Broker Processor Unit of the initiating node is further configured to deliver the message from the queue to the intended Consumer Processor Unit. The notification may be transmitted (pushed), either immediately or with some time delay, to the intended Consumer Processor Unit notifying the intended Consumer Processor Unit that a new message is available.

Preferably, the Broker is configured to retrieve the message from the queue to the Consumer Processor Unit in accordance with a delivery guarantee.

The message is considered to be delivered when an acknowledgement message from the Consumer Processor Unit is received at the Broker Processor Unit. The present system is configured to issue an acknowledgement notification of the logical clock timestamp of the message by the Consumer upon the message is delivered to the intended Consumer. The logical clock timestamp is assigned by the Broker for the message when the message is published in the queue.

The message is retrieved from the queue to the intended Consumer subsequent to delivering other messages contained in the queue which have logical clock timestamps preceding the logical clock timestamp of the message in question and which have been acknowledged.

The registration to the queue may be closed subsequent to receiving a large number of messages, processing of the messages and confirming the receipt of the messages in question with the acknowledgement messages by a Consumer. The Consumer, alternatively, may choose not to detach itself from the queue. The queue may be deleted by the Broker upon the acknowledged messages reach a certain age (defined at the queue creation time) and are deleted.

The queue is assigned the queue deadline attribute. The message is considered active until it is published in the queue for longer than the duration of the queue deadline attribute.

The initiating (sending) compute node is provided with at least one first interface, while at least one second interface is embedded in the target (receiving) compute node. In operation, the first interface and the second interface are operatively connected by an RDMA-based communication channel. Upon registering the Consumer Processor Unit to the queue, the message is delivered from the queue to the Consumer Processor Unit operatively coupled (registered) to the target compute node.

Preferably, the first interface of the initiating compute node and the second interface of the target compute node include an interface selected from a group consisting of an attached interface configured to provide access to the queue, a simple interface configured as a library associated with the attached interface to provide function-call entry points, and redqfs interface configured to provide access to the queue via a Linux FUSE file system.

These and other objects of the present invention will be more apparent after reading further Description of the Preferred Embodiment(s) in conjunction with the accompanying Patent Drawings in the current Patent Application.

DETAILED DESCRIPTION OF THE PREFERRED EMBODIMENT(S)

Figure 1:
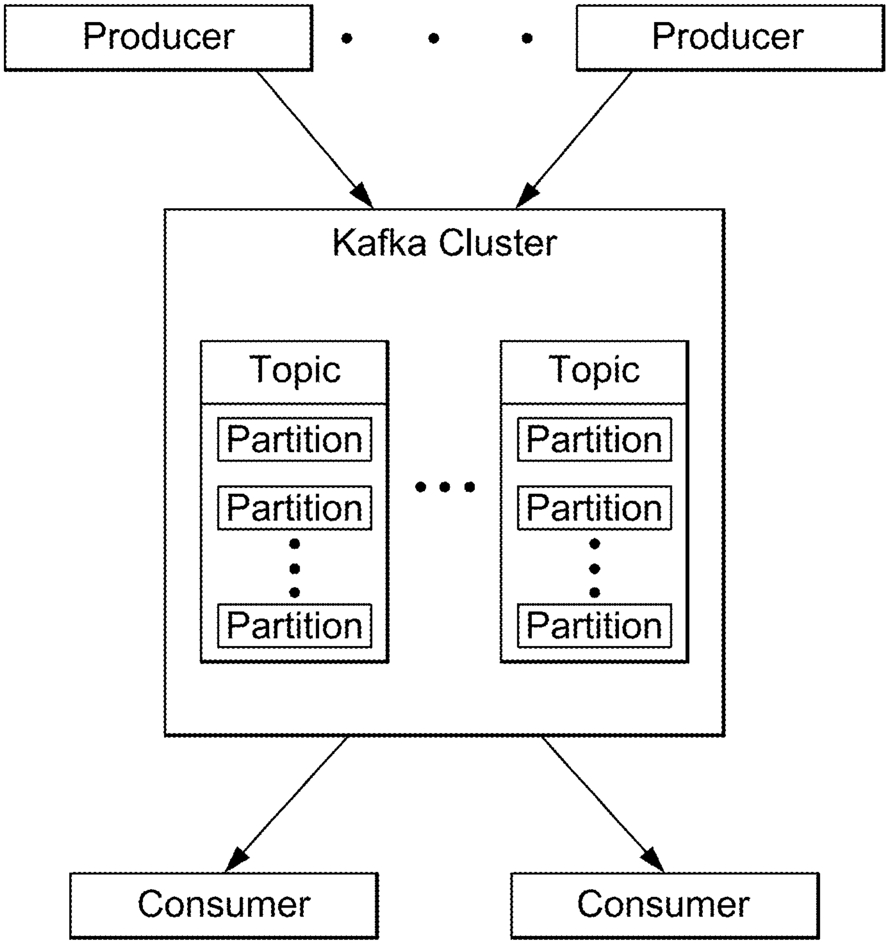
FIG. 1 Prior Art
FIG. 1 is a schematic representation of the Apache Kafka messaging system.
Figure 2A:
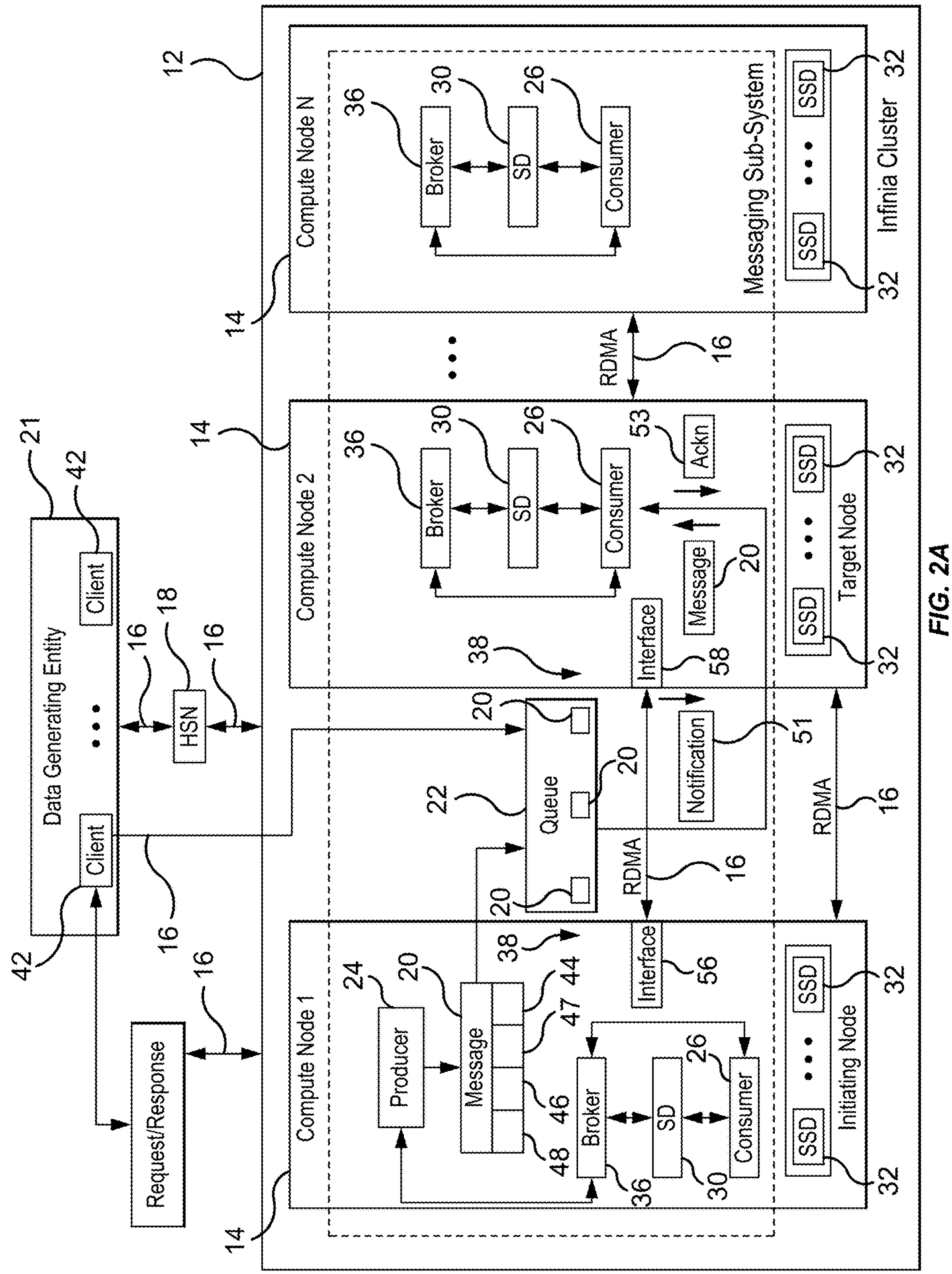
FIG. 2A is a schematic representation of the distributed data storage system with the subject Messaging system integrated within the cluster.
Figure 2B:
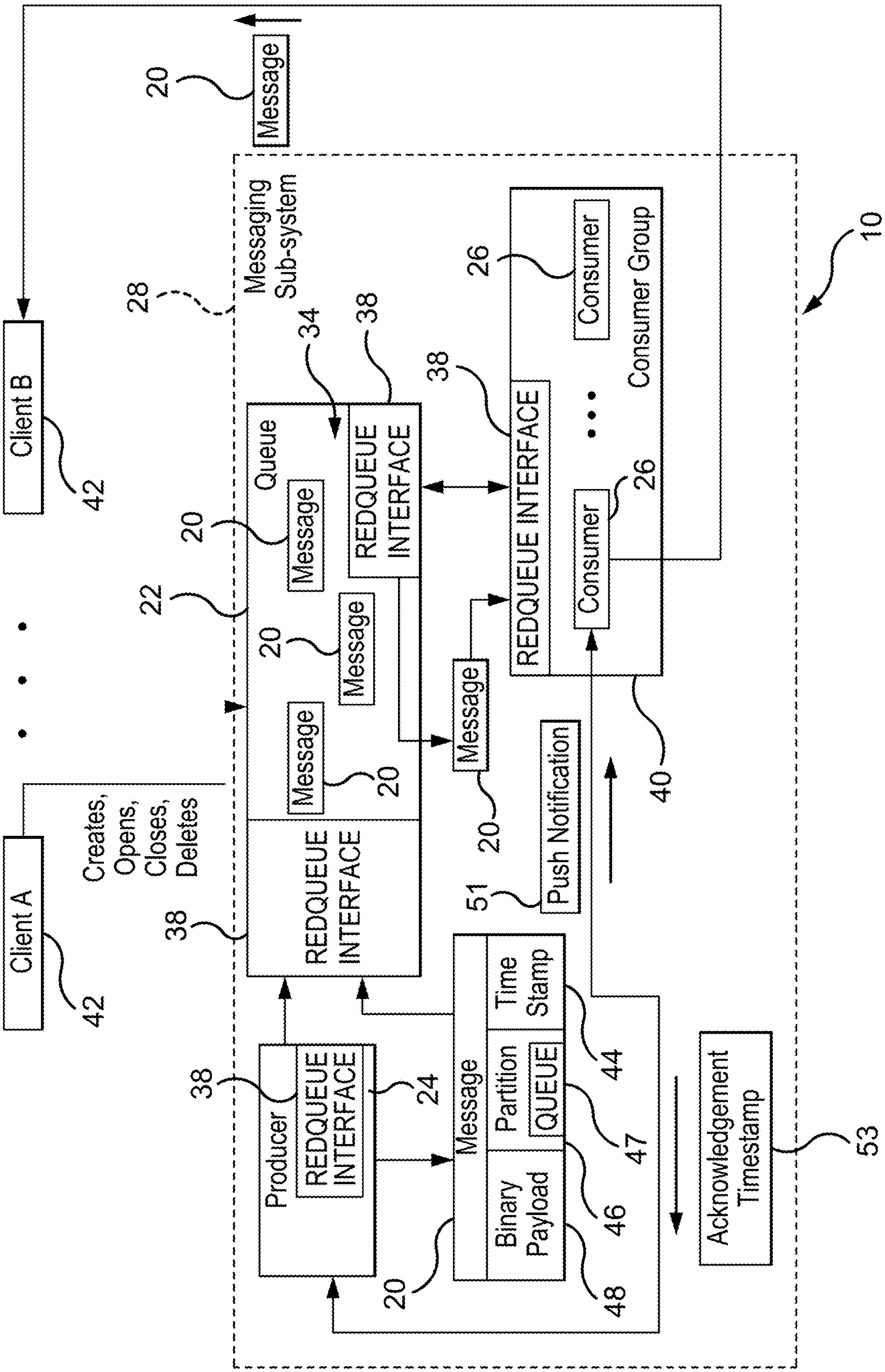
FIG. 2B represents, in a simplified format, the subject messaging process.
Figure 2C:
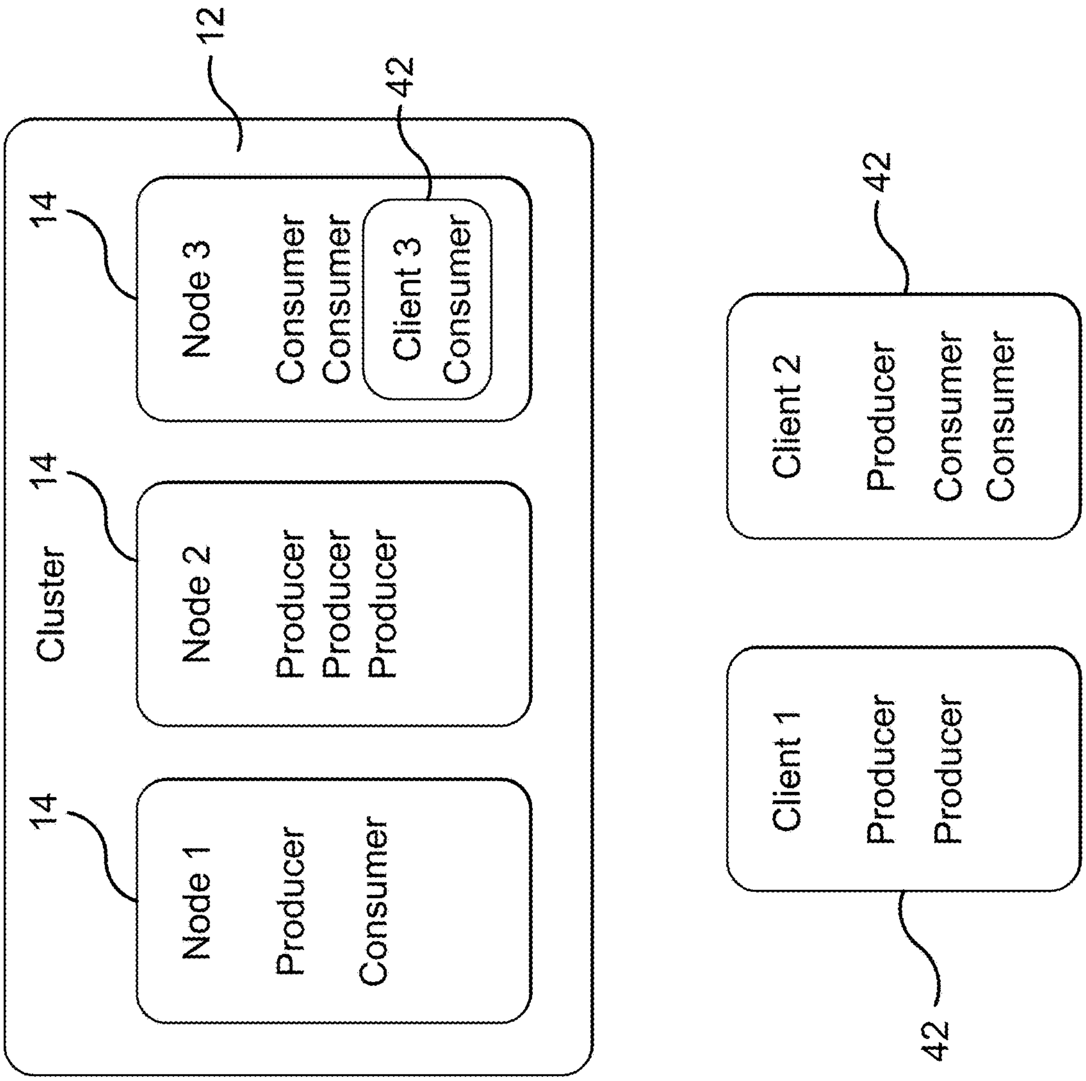
FIG. 2C is a simplified representation of the subject messaging system depicting alternative operational connections between a Client and the Producer(s)/Consumer(s)

Referring to FIGS. **2A-2*c* and 3-8, the subject distributed data storage system 10 is a data/message migration and storage system which may include a number of clusters 12 (for simplicity of the further disclosure, and as an example, only one cluster 12 is shown in FIG. 2A). Each cluster 12 includes a plurality of compute nodes 14. The number of compute nodes 14 in each cluster 12 may vary in a wide range of compute nodes. As an example, FIG. 2A shows N compute nodes 14 (Compute Node 1, Compute Node 2, . . . Compute Node N), while FIG. 2C shows, as an example, there compute nodes 14 (Node 1, Node 2, Node 3) within the cluster 12**.

In the embodiment shown in FIG. 2A, compute nodes 14 are interconnected through a network of communication channels 16. Communication channels 16 may provide a direct connection between Compute nodes 14 for transmission of messages 20.

The Compute nodes 14 can also be connected through the High Speed Network (HSN) 18 to receive various Requests generated by the Data Generating Entity(ies) 21 or to transmit Responses to the Data Generating Entity(ies) 21. The Data Generating Entity 21 may be represented by, or operatively coupled to, one or numerous Client Nodes 42 which can issue and/or receive various Requests/Responses to and from Compute nodes 14 through the High-Speed Network 18. The HSN 18 may be based on any of the network transport protocol. However, it is preferred that the RDMA-capable network technology is used for communication in the present system.

The present system 10 relies on RDMA-capable network technology for inter-node communication, which is beneficial, as it supports a highly efficient data replication between Compute nodes 14. The RDMA (Remote Direct Memory Access) enables networked computers to exchange data directly in the main memory, by-passing the CPU, cache, and operating system for faster and more efficient data transfer.

The present messaging sub-system 28 supports the data/message migration and data storage through a dynamic networking layer (channel) or communication channels 16 which can load balance messages and RDMA (Remote Direct Memory Access) operations over one or several pathways and may have the ability to self-heal if pathways experience transient network faults.

Compute nodes 14, for the messaging purposes, may include at least one initiating node (the Compute node 14 chosen for sending the message 20) and at least one target node (the Compute node 14 for receiving the message 20). As exemplified in FIG. 2A, the initiating Compute nodes and the target Compute nodes are connected through RMDA channels 16. The initiating node 14 (which may be a storage Compute node 14 or a Client node) communicates with the target Compute node (which may be any of the storage nodes or the Client node) in the system 10.

Client 42 is a computer or a process that accesses the services or resources of another process or computer on the network. Client 42 can connect to the cluster 12 for various operations including sending requests and receiving responses via the HSN 18, as well as to create a queue 22 for the subjecting messaging process, as will be detailed in further paragraphs.

Client 42 may be referred to herein as a local Client or a remote Client. Each Compute node 14 in the cluster 12 may be connected with the local client (logically presented within the same cluster 12). Alternatively, as required by the system operation, a server node 14 may also communicate with a remote client residing external the cluster 12 of the server node 14.

Each Compute node 14 may be operatively coupled to other Compute nodes 14 residing within the same cluster 12 or residing within different clusters with a shared network having multiple network interfaces 38 (for example, the initiating interface 56 and a target interface 58), best shown in FIG. 2A.

Migration of messages 20 in the distributed data storage system 10 is supported by a distributed messaging sub-system 28 integrated in the cluster 12. Although the principles of operation of the subject messaging sub-system 28 are applicable to integration in a wide range of distributed data storage systems, in one of the numerous implementations, the subject distributed data storage system 10 is contemplated in configuration of the Infinia data storage system (alternatively referred to herein as the RED storage system).

The Infinia system 10 may include one or a number of Infinia clusters 12, each of which includes numerous Compute nodes 14 as required by the design and architecture of the distributed data storage system 10 and particular intended applications. The messaging sub-system 28 in the present distributed data storage system 10 runs within each Infinia cluster 12 and is distributed among Compute nodes 14. In each Compute node 14, messaging Sub-system 28 includes a Storage Daemon (SD) 30 which is a program used to download and share files in the distributed data storage system 10. The Storage Daemon 30 is also responsible for replicating messages 20 across a set of solid state drives 32, where each set of solid state drives 32 is referred to herein as a partition 46. For each partition 46, the participating solid state drives 32 are distributed across the cluster 12 so as to maximize resiliency and to minimize potential for data loss.

The subject messaging sub-system 28 is also configured with a Producer Processor Unit 24 (also referred to herein as a Producer), a Consumer Processor Unit 26 (also referred to herein as a Consumer) embedded in each Compute node 14, as well as a Broker Processor Unit 36 (also referred to herein as a Broker).

The Storage Daemon program 30 manages access to solid state drives (SSDs) 32 and stores messages in a Bε-tree 34. The Bε-tree is an example of a write-optimized data structure which is used in the present system to organize on-disk storage for an application, such as a database or a file system. The Bε-tree provides a key-value API, particularly for inserts, range queries, and queue-value updates.

Bε-tree supports high write throughput, and it is implemented by adding a buffer to each Compute node in the O-epsilon tree, so that there is no need to travel all the way down the tree every time an access to a data is searched for. When a buffer is full, all of its contents are pushed down to the next level in one batch.

The messaging sub-system 28 runs the Broker 36 on each Compute node 14. The Broker 36 receives messages from the Producer 24 and forwards them to the Storage Daemon 30. The Broker 36 also receives new messages 20 from the Storage Daemon 30 and dispatches them to the Consumers 26 registered to the queue 22.

The Messaging sub-system 28 operates through an interface 38 (or a set of interfaces 38) installed in various entities of the system 10 for communication of the messages 20 therebetween. For example, the Producer 24, also referred to herein as a Publisher, is a user of the interface 38 installed in the Producer 24 and the queue 22 (as best shown in FIGS. 2A-2B) that adds messages to the queue 22, as will be described in further paragraphs. Messages 20 are stored in the queue 22 as upserts.

The Consumer 26, also referred to herein as a Subscriber, is a user of the interface 38 that registers with the Consumer group 40 and consumes the messages 20 from the queue 22 to which the Consumer group 40 is attached (registered). A Consumer 26 is active when it is responsive to the interface(s) 38 "call-back" or "wait" commands for a message in a synchronous call.

A Consumer group 40 is a persistent registry of the Consumers 26 for a particular queue 22. The Consumer group 40 is active when at least one of its Consumers is active.

Producers 24 and Consumers 26 are capable of running on the same cluster 12, as depicted in FIG. 2A, but also can run on Client nodes 42.

As depicted in FIG. 2B, the message 20 generated by the Producer 24, includes a predetermined layout 46 (also referred to herein as a partition), and a binary payload 48. The binary payload 48 constitutes a value component of the message 20, while partition 46 of the message 20 constitutes a key component of the message. Partition 46 generated by the client 42 defines data storage devices 32 (for example, solid state drives) to which the message 20 is to be replicated for redundancy purposes.

In operation, the message 20 is generated by the Producer 24 and transmitted to a Compute node 14, which, for the respective message 20, will serve as the initiating (or sending) Compute node of the array of Compute nodes in the Cluster 12. Subsequently, the Producer 24 transmits the message 20 to the Broker 36 of the initiating node, which, in its turn, forwards the message 20 to the SD 30 of the initiating node, which replicates the message 20 across the set of DDS (i.e., layout, or partition) 46, as defined by the Client 42 in the message 20. For each partition 46, SD 30 publishes the message 20 to the queue 22.

The queue 22 can be created by the Client 42 or the cluster sub-system (Producers or Consumers). In fact, any operation in the subject system may be conducted either from the Client or the cluster's Producer and Consumer Processor Units. Moreover, either the Client or the cluster's messaging Processor Units can run any number of Producers 24 or Consumers 26, as best represented by FIG. 2C.

As an example, the following description of the subject messaging process will present Client 42 as creating the queue 22. Particularly, the Client creates a queue metadata entry on the cluster. The queue 22 created by the Client 42, initially does not contain messages. In a subsequent process, all queue data (queue/group/consumer metadata, messages, acknowledgements, etc.) will be persistently stored on the cluster.

Figure 3:
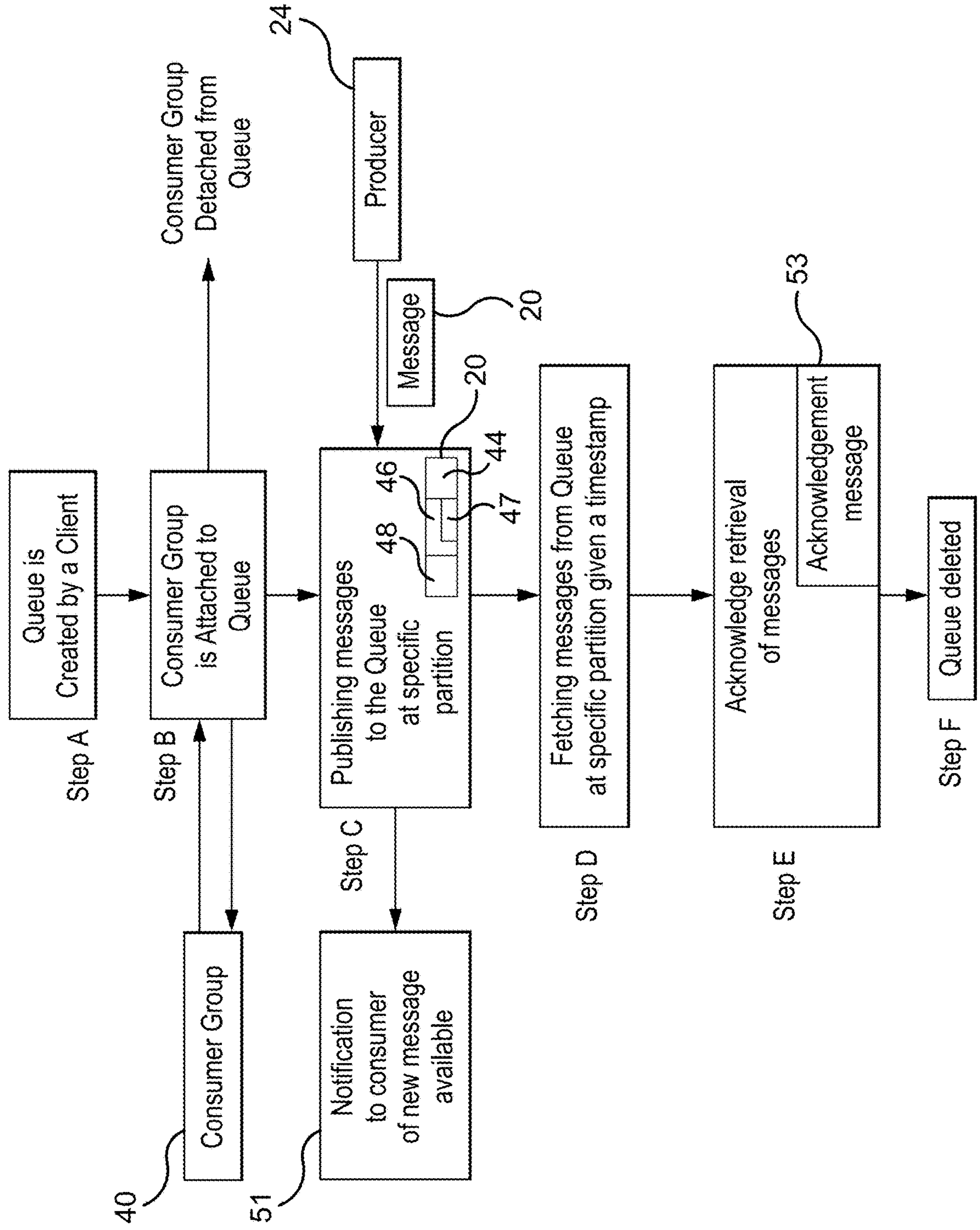
FIG. 3 depicts the sequence of operations in the subject messaging process.

Messages (as well as acknowledgements) can be published to the queue 22 and received from the partitions. The partition 46 is essentially a container of messages in which the messages are ordered by timestamp (GTX). A partition is backed by a small number of disks 32 on which each message (and acknowledgments) is replicated. The disks 32 of a single partition typically belong to different nodes. As shown in FIGS. 2A-2B and 3, the partition 46 also identifies the queue name and the queue location 47.

The messaging sub-system 28 uses the queue 22 to denote a container of messages. The queue 22 (also referred to herein as a topic, or channel), is a persistent distributed replicated container of partially ordered messages 20. During the routine of publishing the message 20 in the queue 22, the message 20 is assigned a logical clock timestamp 44. The message 20 has a dependency timestamp and will be delivered to the receiving Consumer 26 only after all messages from the same queue 22 with timestamps not exceeding the dependency timestamp, have been acknowledged.

The queue 22 may have a deadline attribute, measured as wall-clock duration. A message 20 is "alive" until it is published in the queue 22 for longer than the queue deadline.

A message 20 is added (also referred to herein as posted or published) to the queue 22 via Producer 24. Consumers 26 remove the published messages 20 from the queue 22 according to the delivery guarantees which is an important feature of the subject messaging sub-system which also supports push notifications for delivering messages to consumers. The subject messaging sub-system 28 also supports retrieving back acknowledged timestamps for a given Consumer group.

The delivery guarantees are contemplated in the present system in two modes which include:

[at-least-once] when a message 20 published to the queue 22 is delivered to a Consumer 26 in every Consumer group 40 attached to the queue that is active the whole time while the message is alive, and

[at-most-once] An acknowledged message will not be delivered again.

The mode [at-least-once]guarantees that the messages are not arbitrarily lost. Because of queue deadlines, a simpler guarantee "a message published to a queue is delivered to a consumer in every consumer group attached to the "queue" cannot be enforced.

The condition of "is active the whole time while the message is alive" might look exceedingly strong. It assumes that if a group loses all members at least once while the message is alive, the message is not necessarily delivered to the group.

A weaker, but still implementable condition, would be Exactly-once —when delivery is not achievable in an asynchronous system (cf. the Byzantine Generals).

The modes [at-least-once]& [at-most-once]constitute a reasonable approximation. It is still possible that a message is delivered more than once, if the Consumer fails before the acknowledgement call returns, so the Consumers must be ready to handle duplicates.

If an unacknowledged message is re-delivered, it is not necessarily delivered to the same consumer.

The mode [at-least-once]implies that the implementation might enforce an admission flow control for a queue so that active consumers are able to process all alive messages.

As shown in FIG. 3, in Step A, initially a queue 22 is created by the client 42. Subsequently, in Step B, a Consumer group 40 is registered to the queue 22. The Consumer group 40 is a collection of Consumers 26, where it is guaranteed that at least one Consumer receives a message 20 published to the queue 22. A Consumer group 40 is created on all partitions 46 defined in the message 20 by the producer 24. If there are multiple Consumer groups 40 per queue 20 and partition 46, then the Consumers 26 in the Consumer group 40 collaborate fairly in the consumption of the messages 20 from the queue 22, meaning that, on average, each Consumer receives the same number of messages. The Consumer group 40 can be detached from the queue 22. This operation removes the association to the queue and deletes all data associated with the Consumer group 40.

In the subsequent Step C, the message 20 (in the form of arbitrary binary data) can be published by the Producer 24 to the queue 22 in accordance with the queue name/location 47 identified in the message 20. During publishing the message 20 in the queue 22, the Producer 24 assigns the message 20 with a logical clock timestamp 44. The timestamp is a monotonically increasing integer that is unique per partition 48. Also, upon the new message 20 is available for the Consumer 26 to retrieve from the queue 22, the notification 51 is sent to the Consumer 26 that a new message is available for retrieval.

Subsequent to Step C, in Step D, a range of messages 20 can be retrieved (fetched) from the queue 22 at a specific partition 46 given a timestamp 44 to fetch from and the number of messages to expect.

In the subsequent Step E, the retrieval of messages of Step D can be acknowledged (per Consumer group 40 and partition 46) given a timestamp 44. Acknowledgement is a process, where Consumer 26 of a delivered message acknowledges that the message has been fully processed by invoking the acknowledgement interface 38. Message 20 is acknowledged by an acknowledgement message 53, when the call returns from Consumer 26. After acknowledgement, the consumer group will not receive any messages that are older or equal to the acknowledged timestamp.

The message delivery is temporally decoupled from the message generation. Consumer 26 can attach to the queue 22 at a later point in time and obtain all the messages from the latest timestamp this particular Consumer acknowledged in the past. Produced but still un-acknowledged messages are stored in the Bε-tree.

In Step F, the queue 22 can be deleted. The deletion of the queue 22 is associated with deletion of all data associated with the Consumer group, messages, and acknowledgements.

The queue 22 is not deleted immediately upon receiving the acknowledgements. Instead, the queue 22 has the feature of retention (deadline), where acknowledged messages are eventually deleted once they reach a certain age (defined at the queue creation time).

Figure 4:
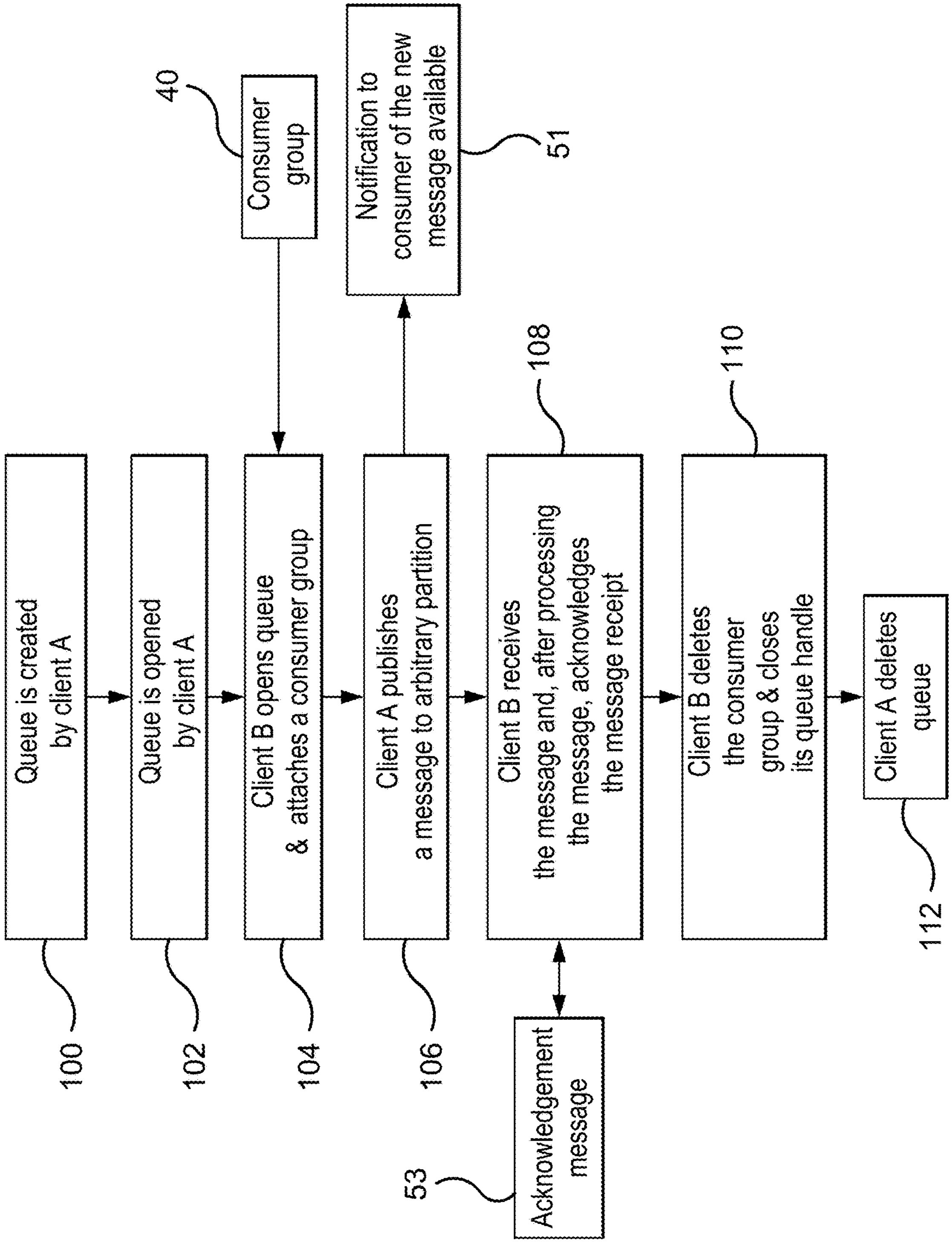
FIG. 4 is a flowchart diagram representing the subject messaging process between a Client A and a Client B.

Referring to FIGS. 2A-2B, and 3-4, the exemplary messaging process assumes that there are two clients A and B involved in the transmission/reception of the message 20. As depicted in FIG. 4, the messaging routine begins in logic block 100, where a queue 22 is created by client A.

In a subsequent logic block 102, the queue 22 is opened by the client A.

In the following logic block 104, Client B opens the same queue 22 and attaches (registers) a Consumer group 40 including a message call-back service.

When the event of interest takes place, the Producer 24 (or the Broker 36) publishes a new message 20 to an arbitrary partition in the logic block 106. At this stage of the routine, the Broker 36 adds a timestamp 44 to the message 20. Also, upon the new message 20 to be retrieved from the queue 22 is available for the Consumer 26, the notification 51 is sent to the Consumer 26 that a new message is available for retrieval.

Subsequently in the logic block 108, Client B receives the message, and, after successfully processing it, sends out an acknowledgement message 53 using timestamp and partition. After acknowledgement, the consumer group will not receive any messages that are older or equal to the acknowledged timestamp.

From the logic block 108, the logic flows to the logic block 110, where client B deletes the Consumer group 40 and closes its queue handle. Subsequent to logic block 110, the client A deletes the queue in the logic step 112. The queue is not deleted immediately upon receiving the acknowledgements. Instead, the queue has the feature of retention (deadline), where acknowledged messages are eventually deleted once they reach a certain age (defined at the queue creation time).

Figure 5:
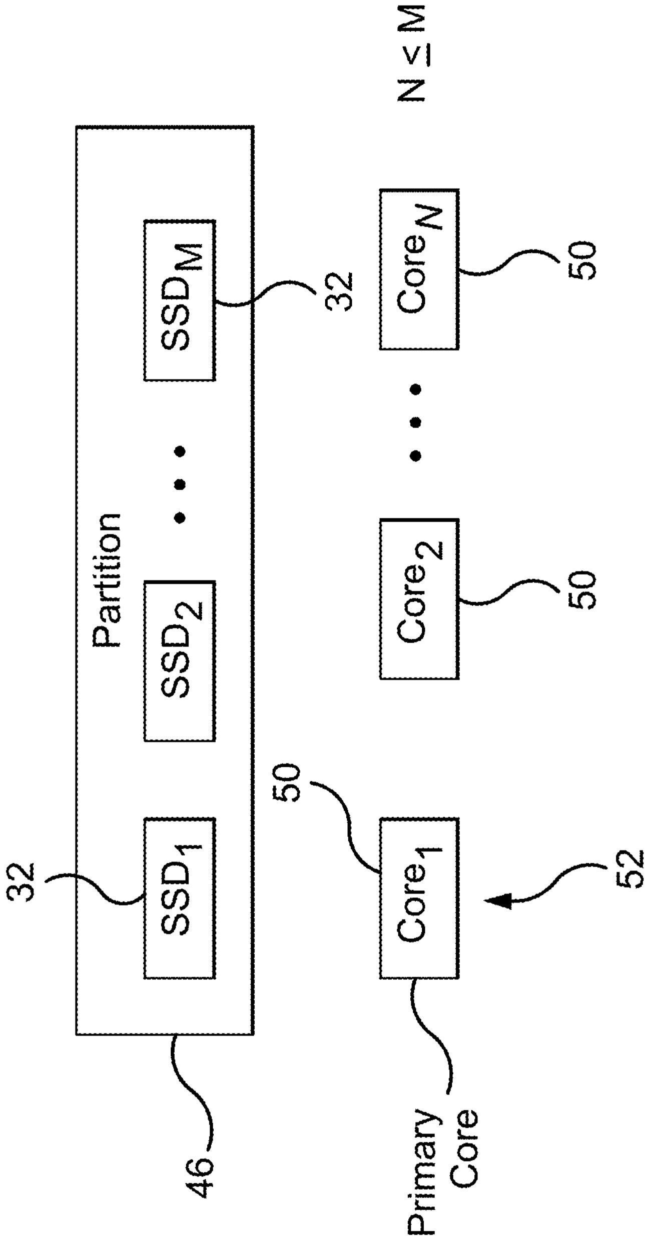
FIG. 5 is a schematic diagram depicting the organization of key components of the messages in the P-epsilon tree.

As indicated in previous paragraphs, a message 20 can be published to a specific partition 46, also referred to herein as a layout. As depicted in FIG. 5, a partition 46 may consist of M drives 32 (also referred to herein as solid state drives), with each drive 32 connected to exactly one compute (or CPU) core 50. Each Compute node 14 may have multiple CPU cores 50. The term "core" is used to refer to the Central Processing Unit (CPU) of computing devices. Each Compute node 14 may include from one to multiple CPUs, thus being a single core or multi-core device. A partition 46 is supported by N compute cores 50, wherein $N<M$. Exactly one of the N compute cores 50 is named the Primary Core 52 of the partition 46.

Messaging sub-system 28 will only publish messages to the Consumers 26 that are registered on the Primary Core. Hence, if a Producer 24 knows that a specific Consumer 26 is registered to the Primary Core 52, then the Producer 24 can publish a message 20 to the partition 46 that has the Primary Core 52. This approach allows for the efficient messaging, since, in this arrangement, Producers are able to co-locate messages with Consumers, thus avoiding additional networking.

Figure 6:
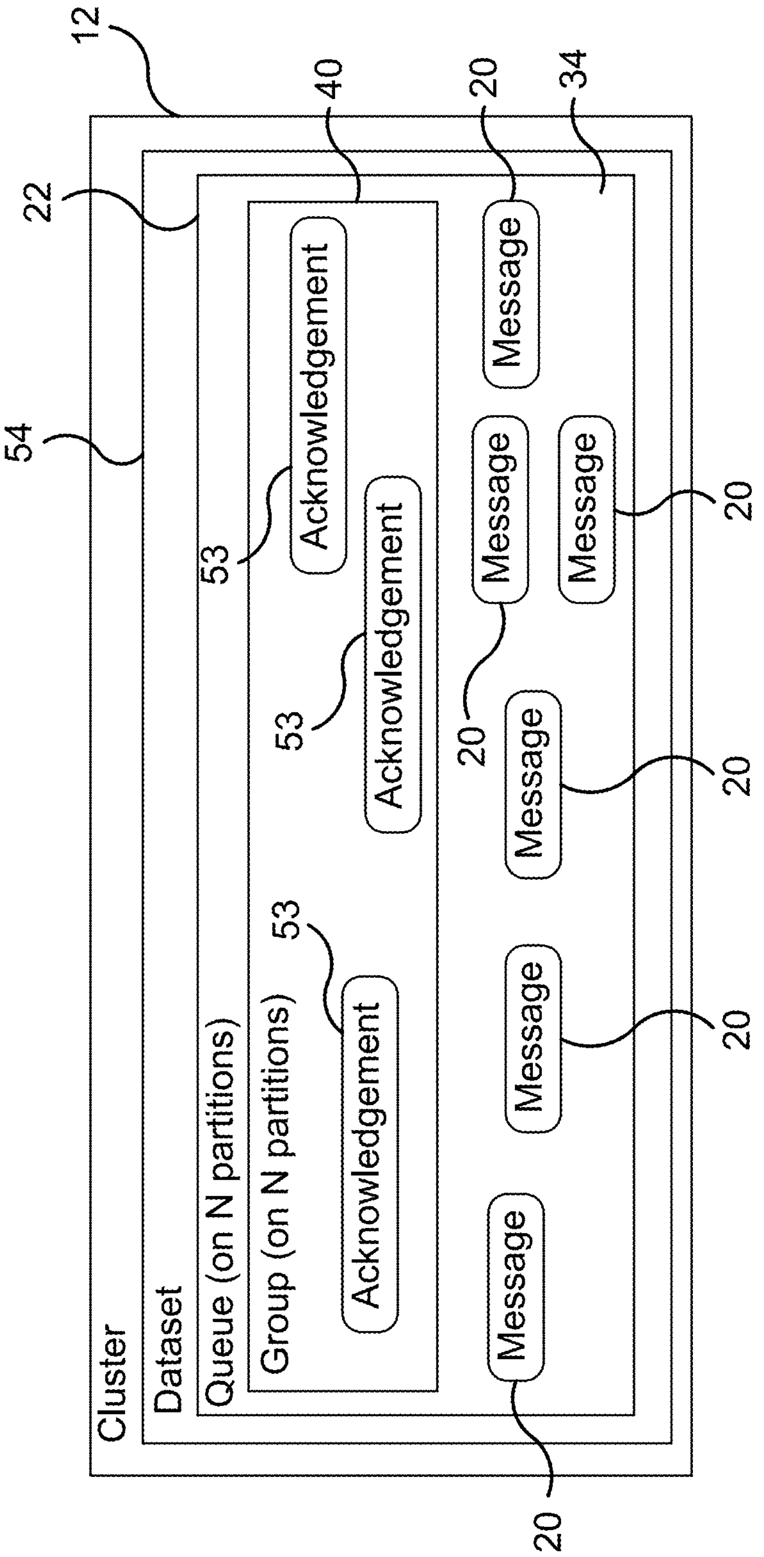
FIG. 6 is a schematic representation of publishing a message to a specific partition.
Figure 7:
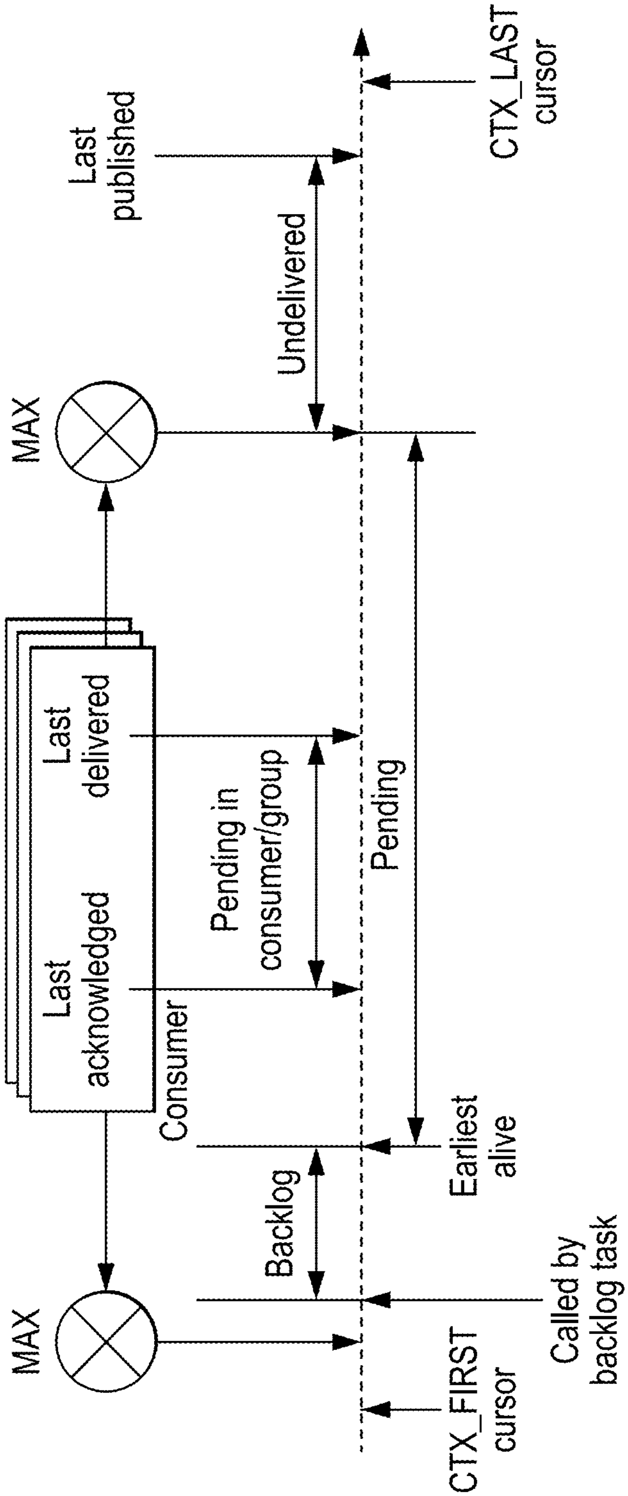
FIG. 7 is a diagram of a message upsert keys for a given consumer group.

FIG. 6 depicts a manner in which keys within the O-epsilon tree 34 are organized. Datasets 54 are embedded within the cluster 12. A dataset 54 is an entity that allows for the separation of tenants, sub-tenants, and data domains. Under a dataset 54, any number of queues 22 can be available. A queue 22 hosts groups (Consumer groups) 40 and messages 20, where each message resides on a specific partition 46. A Consumer group 40 hosts acknowledgements on a specific partition 46.

Each key component of the message 20 in the O-epsilon tree 34 has a value components of the message 20 associated with the key component, thus making it a key-value pair. Both queue 22 and Consumer group 40 have a value which stores information, such as identifiers or queue/group settings. The value of a message 20 is the binary payload.

As shown in FIGS. 2A-2B, the transmission of messages 20 between clients 42, for example, clients A and B, is attained in the present Infinia system 10 via multiple interfaces 38 embedded in the messaging sub-system 28, Compute nodes, as well as the queue 22. For example, the initiator interfaces 56 are incorporated in the initiating node (or sending node), while target interfaces 58 are embedded in the receiving (or target) node. In addition, interfaces 38 are provided between the queue 22 and the Producer 24, as well as between the queue 22 and the Consumer 26, which provide an access to the queue 22. This approach may support load balancing the messages and RDMA (Remote Direct-Memory Access) operations over multiple connections.

The Interface 38 in the present system is configured to access the queue 22. The Interface 38, for example, may be configured in the format of a scalable interface with partitions and call-backs, which is designed to be used on the system's server side, and which provides tasks that can be used by the server and client node to access queue(s) 22. In addition, Interface 38 may be configured as a library wrapper around the attached Interface that provides function-call entry points. In an exemplary implementation, the Interface 38 may be configured to provide access to the queue 22 via Linux Fuse file system.

The Interface 38 operates through a set of commands, descriptors, actions and identifiers to perform various routines and functions for the task of accessing the queue 22. The tasks executed by Interface 38 (or participating in) may, for example, include, but are not limited to:

- locating and, if necessary, creating a persistent queue;
- returning the queue descriptor;
- destroying a persistent queue (the queue must be empty);
- closing the queue descriptor;
- locating and, if necessary, creating a persistent consumer group, associated with the queue;
- returning the group descriptor (the group descriptor must have been opened for reading; the consumer becomes active once this call returns);
- detaching the group from its queue and destroying the persistent group state;
- closing the group descriptor (the consumer ceases to be active when this call returns;
- receiving a message from the queue to which the group is attached (the message is considered to be delivered when this call returns. The messages are delivered in an order consistent with their dependency order and delivery guarantees (v.s.). The message payload pointer points to the memory owned by the library. This memory might be reused by the library as soon as the message is acknowledged);
- acknowledging the message with the given timestamp (acknowledging a message implicitly acknowledges all the messages with timestamps not exceeding the given one. tx is not necessarily equal to the timestamp of an actual message. If some messages with timestamps earlier than tx have not yet been delivered, they are still considered acknowledged and will not be delivered. Once a message is acknowledged explicitly or implicitly, the implementation is free to reuse its payload memory);
- publishing a message to the queue opened for writing (the message is published and alive once this call returns);

Consumers run within Instance 38 (also indicated in FIG. 2A as interfaces 56 on the initiating nodes 14, and interfaces 58 on the target nodes 14). Consumers for a particular queue run on instances corresponding to CATs on which the queue is striped. Subscription is push-based: a consumer registers a call-back (also referred to herein as a notification 51) that will be called when a new message is available. The call-back is invoked on the message upsert primary instance.

Interface 38 also performs the following functions:

- returns a task that creates a queue with the given layout and specifies how the queue is striped. The queue descriptor is returned in the parameter on task completion;
- returns a task that deletes an existing queue;
- returns a task that opens a descriptor for an already existing queue for writing (this function is performed by a producer-side interface. The task sets the queue descriptor parameter before completion);
- returns a task that publishes the message to the queue (here an attempt is made to select "the best" layout for the message upsert: If possible, piggy-back the message upsert to the existing oprec without introducing more targets);
- if possible, co-locates the message upsert with the primary replica of the given layout, which typically will be the layout of the entity related to the message, like a file or a bucket:
- uses queue stats to distribute messages across a sufficient number of consumers to reduce backlogs;
- returns a task that opens a descriptor for an already existing consumer group;
- returns a task when the consumer for the group is not supposed to run at this instance (the callback will be invoked for message delivery and queue control messages (to be defined). A typical callback will wake up the caller task);
- returns a task that acknowledges the message.

The subject messaging sub-system 28 presented in FIGS. 2A-2C and 3-8, may be embedded in numerous distributed data storage systems, including, as an example, the Infinia distributed data storage system. In association with the Infinia system, the clusters 12 may be intermittently referred to as Infinia clusters 12, and the Compute nodes may be further referred to as the Infinia nodes 14. Client nodes 42 have access to the corresponding Infinia nodes 14. Any node (both the client node 42, and server/compute node 14) is configured for usage of the subject messaging sub-system 28, as will be detailed in further paragraphs.

In the Infinia cluster 12, the traffic profile is defined as either a "client-to-server" or "server-to-server". The Infinia storage server(s) associated with each node 14 may be configured to support the communication between Infinia storage servers. However, the subject messaging approach is not limited to "client-to-server" or "server-to-server" architectures, but is rather referred to as "node-node" architectures, where compute nodes 14 may be any mix of clients or servers.

Each compute node 14 in the Infinia cluster 12 may be configured with an Agent Processing Unit (also referred to herein as an Agent), which supports a Management Process running on the Infinia node 14. The Management Process monitors the Infinia nodes 14 and their functionality. Each Infinia node 14 is configured with a plurality of storage devices 32, which may also be referred to herein as Core Affined Storage Targets (CATs). The present system 10 exploits a large array of Non-Volatile Memory (NVM) devices 32 (such as, for example, solid-state drives) which are arranged in a plurality of Infinia clusters 12 (or containers), where the Infinia nodes 14 may communicate with other Infinia nodes 14 in the same Infinia cluster (or container) 12 or with specified Infinia nodes in other Infinia clusters 12.

Each Infinia compute node 14 also may be configured with a corresponding Instance IO Server Processing Unit (also referred to herein as an Instance), which supports an IO server process running on the Compute node 14. Instances are generated (created) by the Agents. Instances "own" the local CATs 32 and supply IO services to clients 42. The Clients 42 may be represented by the local clients (local to the Infinia nodes 14 and Infinia cluster 12) and remote client(s) (remote from the Infinia cluster 12).

The Infinia system 10 further includes a distributed configuration database which stores Cluster Configuration, Runtime, Layout table, Agent Registry, Inventory, and other databases reside in respective Infinia compute nodes 14.

In one of numerous exemplary embodiments, the compute nodes 14 in the Infinia cluster 12 may run various Linux containers using Docker/k8s. In this exemplary embodiment, the Agent and the Instance run in a single Linux container, with the Agent container controlling the access to the local CATs 32.

The Instance may reside in the Infinia cluster 12. The Instance is executed by different threads running within the Instance. These threads may include a Cluster Manager thread which is responsible for handling the cluster management, Instances and CATs, Evicts and joins from and to the Infinia cluster 12, makes all the intelligent decisions to grow and/or shrink the Infinia Cluster.

Reactor threads are also included in Instance. The Reactors threads are bound to a specific Infinia cluster 12 and run different tasks. For example, Reactors threads run handler tasks (Handler Processing Units) which are responsible for replication and routing requests from clients/servers to local CATs or remote Instances.

The Instance process also may include another reactor which runs the task for the CAT dedicated to another reactor. All activities involving CATs are executed by the reactor task running on the local core of CAT. Having this configuration, the Infinia system 10 avoids unnecessary locking by sending messages to intended handlers of the CAT. Each CAT 32 provides a persistent storage target for replicated data, hosts Intent Log, and includes a Bε-tree.

The operation of compute nodes 14 in the Infinia cluster 12 depends on the system application. The Infinia nodes 14 may function as servers, supercomputing clusters, etc., and have a capacity to "write" by outputting the data to an external memory, as well as "read" data from an external memory, or other type storage media.

A core 50, as depicted in FIG. 5, is a CPU (Central Processing Unit) or processor which can independently perform, or process, all computational tasks and may be considered as a smaller CPU or a smaller processor within a big processor. CPU affinity enables binding or unbinding a process, thread, or multiple processes, to a specific CPU core or to a subset of CPU cores. As an example only, but not to limit the scope of the present invention to a specific CPU core, the following description will be presented in a manner that the process(es) will run from the specific core, i.e., will execute on the designated CPU(s). At the time of resource allocation, each task is allocated to its related processor in preference to others. Processor affinity takes advantage of the fact that remnants of a process that is run on a given processor may remain in that processor's state (for example, data in the cache memory) after another process was run on that processor. Scheduling a CPU-intensive process that has few interruptions to execute on the same processor may improve performance by reducing degrading events such as cache misses, but may slow down ordinary programs since they would need to wait for that CPU to become available again.

Each message 20 carries information on the timestamp 44, partition 46 (including the queue name/location 47), and binary payload 48, and is associated with two primary components, i.e., a key component and a value component, where the binary payload 48 constitutes the value component of the message 20. While the value component is the actual data payload, the key component determines which partition the message 20 will go to and the timestamp of the message.

The subject messaging sub-system 28 (optionally referred to herein as REDQUEUE) uses the key schema. In this key schema, messages are stored as upserts across the partition's solid-state devices 32 and in queue 22. The diagram of message upsert keys is presented in FIG. 7.

In the key schema, each key component is defined as: $tenant/$subtenant/$dataset/REDQUEUE_KS/MSG/$qid/$msg_gtx, where $tenant, $subtenant, $datase represent a layout in a format usual for the Infinia system, and where the REDQUEUE_KS is an identifier representing a new key-space allocated for the queue 22, and MSG is a sub-space. $qid is a 32-bit queue identifier within the dataset. Mapping from queue names to identifiers (and other parameters) is stored in another sub-space, v.i.

Value represents the message payload. Hence, the payload size is limited by BEPT_NODE_MAX_UPSERT_VAL_SIZE).

Queue meta-data is represented by:

key having an identifier:

$tenant/$subtenant/$dataset/REDQUEUE_KS/Q/$queue_name, where Q is a sub-space, and value having an identifier: {$qid, $layout, $acl+$permissions, . . . }

Consumer group meta-data is identified by the:

key component, which has an identifier:

$tenant/$subtenant/$dataset/REDQUEUE_KS/G/$qid/$group_name, where

G is a sub-space, and value component, which has an identifier: {$gid, $acl+$permission}, where $gid is a 32-bit group identifier within the queue 22.

Cursor for each Consumer attached to queue is represented by the key component which is identified by the identifier:

$tenant/$subtenant/$dataset/REDQUEUE_KS/MSG/$qid/GTX_LAST/$gtx/$ gid/$stripe, where $gtx is the timestamp of the last message acknowledged by the Consumer at the $stripe instance of the group $gid.

The value component is not assumed for the cursor for each Consumer attached to the queue 22.

The cursor keys may be selected such that they are deliberately placed in the same sub-space as messages, so that in a steady state situation, when the list of alive unacknowledged messages is not too long, the cursor (which is always lexicographically close in the key-order to the key of the last published message), will also be close to the key of the last acknowledged message. Alternatively, the cursor key can use GTX_FIRST instead of (GTX_LAST, so that the cursor is close to the next message to be delivered (assuming the backlog is small).

The timestamnp of the latest message in the queue 22 acknowledged by all Consumers in the Consumer group can be found by fetching the first upsert returned by the prefix lookup with the key $tenant/$subtenant/$dataset/REDQUEUE_KS/MSG/$qid/GTX_LAST This prefix lookup must be run on all queue stripes, which is an expensive operation. It is needed when a backlog task (v.i.) needs to find messages that can be culled (deleted). This can be amortized to an arbitrarily low overhead at the cost of retaining more dead messages.

The system checks whether a message with a given dependency timestamp (::m_dep_tx) can be delivered. There can be some optimizations of this case (e.g., if it is known that the message is delivered on the same instance as the dependent one, then a local check is sufficient), but in general, dependent delivery has an unavoidable cost of global synchronization.

When a Consumer advances its acknowledged cursor from $old_gtx to $new_gtx, it tombstones the . . . /$old_gtx/$gid/$stripe and inserts a new . . . /$new_gtx/$gid/$stripe key.

Backlog

A special Backlog task runs on each Instance of each dataset. It finds all the earliest still existing messages in the queues and checks whether the messages are still alive (i.e., whether their deadline expired). If a message has died, it is shrouded: a new message with the payload {$qid, $message_qtx, $message_payload} is published to a special backlog queue automatically created in every dataset. If the $message_payload does not fit into the shroud, it is split and two shrouds are published to the queue. The original message is then deleted (culled). If a message in the backlog queue expires, it is discarded.

A message is ultimately deleted either when it is acknowledged by all Consumers in the Consumer group or culled (deleted) by the backlog task, whichever event happens first.

Figure 8:
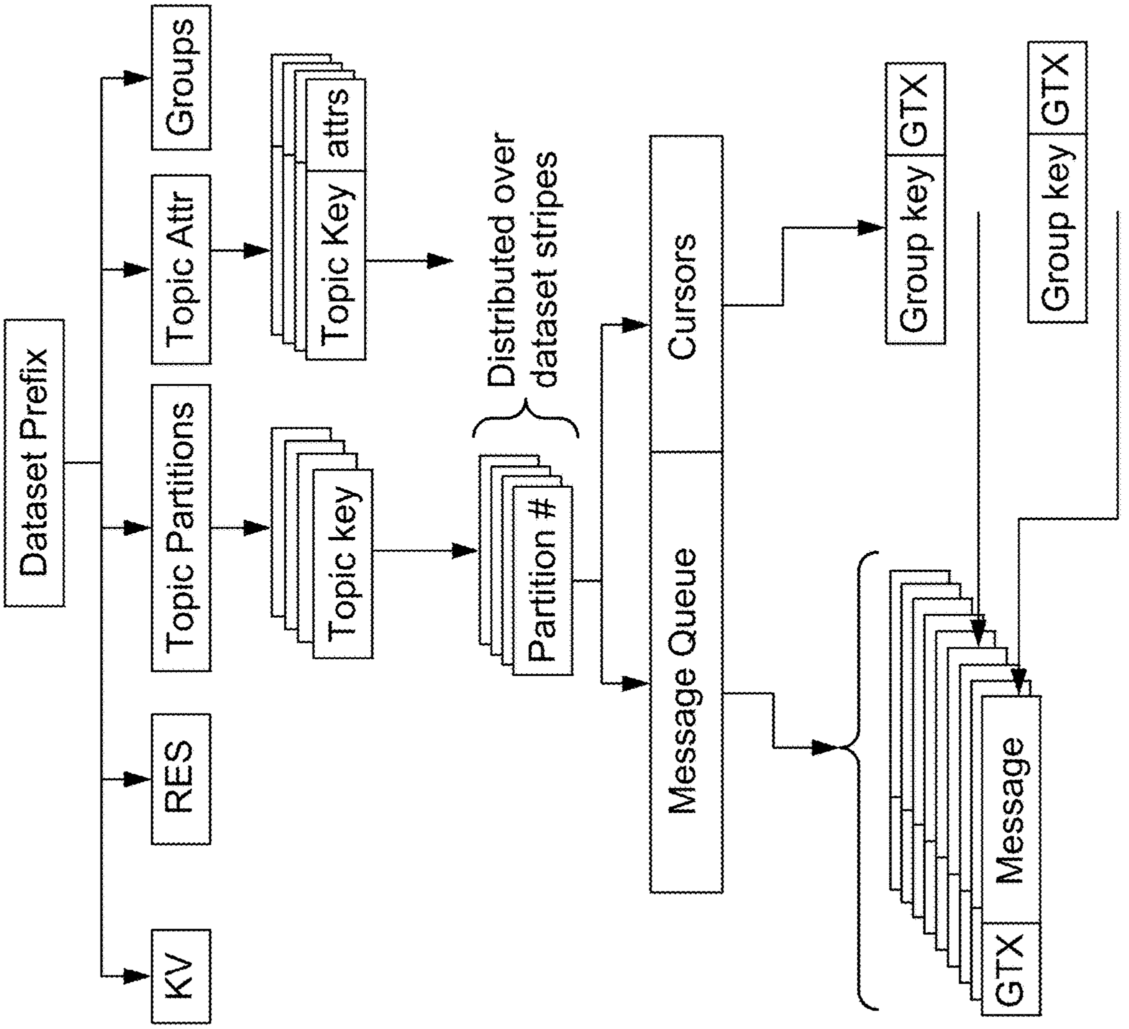
FIG. 8 is a schematic diagram of the subject routine for indicating cursor per Consumer group per partition.

As depicted in FIG. 8, a message is always in exactly one of the following states: (a) undelivered when the message was published, but not delivered to any group, (b) pending when the message was delivered to some Consumers in the Consumer group, but not yet acknowledged by all, and (c) in backlog, when the message deadline expired while the message was still not acknowledged by all Consumers in the Consumer group.

Overflow Notification

When queue 22 is created, an overflow threshold can be optionally specified. The overflow threshold can be specified either as (a) the number of unacknowledged messages, or (b) the age of the oldest unacknowledged message in the queue, or (c) both. If the threshold is exceeded, i.e., there are too many unacknowledged messages, or some messages are unacknowledged for too long, then a message is posted to a special overflow notification queue, specified as part of the overflow threshold.

Dead Letter Queue

A special dead letter queue (dlq) can be created (similar to the Apache Kafka's arrangement) to which Consumers forward messages that they cannot process for whatever reason (such as, for example, transient errors, a wrong format, a wrong version, etc.) The dql can then be analyzed and the messages re-submitted.

Concurrency and Ordering

For concurrency and ordering tasks, an Access control (ACL) may be performed, in which routine ACLs and permission bits are associated with queues and Consumer groups.

Scatter-Gather

For Scatter-gather tasks, a batch of messages may be published, in one call, a batch of up to a specified batch size messages may be received in one call, and all messages up to a timestamp may be acknowledged in one call.

Recovery and Replay

For Recovery and replay tasks, the SQL secondary indices and S3 replication services are used, where the S3 replication service continues replication from reds3 to the other s3 compatible target based on bucket events queue.

It is contemplated that the reds3 service should add create/update/delete object event to the bucket events queue if proper bucket events queue is configured. The object event may include: (a) object name, (b) operation type, (c) time stamp, (d) object ETAG, and (e) object size. The s3 replication service is configured to read events from the queue, perform the object replication operations, and delete the processed events from the queue. The s3 replication service is configured to handle duplicated and missed events.

In one of the implementations, shown in FIG. 8, for each Topic (queue, or channel):

- Partitions are defined by:
  - Dataset key subspace indexed by topic key and partition number;
  - Striped over dataset stripes offset by topic key hash; and
  - Message queue
    - Topic partition subspace populated by message upserts ordered by system timestamp (GTX)
    - Prefix render iterates over all queued messages in GTX order
    - Render aggregates efficiently into bulk/RDMA buffer
- Cursors are defined by:
  - Topic partition subspace indexed by consumer group key Upsert value is the GTX of the last persistently consumed message
  - Message queue prefix render continues from next message after group's current cursor
- Properties are defined as:
  - Dataset key subspace indexed by topic key
  - Hashed by topic key over dataset stripes
  - Stores # partitions, maximum message age etc.
- Consumer group
- Dataset key subspace indexed by group key
- Single key persistently stores joined group members and their topic partition assignment
- Topic partition assignments rebalanced on join/leave
- Automatic leave on client death Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of elements, steps, or processes may be reversed or interposed, all without departing from the spirit or scope of the invention as defined in the appended claims.

What is claimed is:

1. A method for migrating data in a distributed data storage system, comprising:

(a) configuring a distributed data storage system including:

an array of compute nodes arranged in at least one cluster of compute nodes, said array of compute nodes including at least one initiating node and at least one target node, a plurality of communication channels supporting a Remote Direct Memory Access (RDMA)—based networking for interconnecting said compute nodes in said array of compute nodes, a messaging sub-system integrated in said at least one cluster in operative coupling with and distributed among said compute nodes of said array of compute nodes, at least one Client Processor Unit, and a plurality of storage devices, wherein each compute node of said array of compute nodes has an exclusive access to a predetermined layout of data storage devices of said plurality of data storage devices, and wherein said messaging sub-system includes:

at least one Producer Processor Unit configured to publish at least one message to a fast data storage, and at least one Consumer Processor Unit operatively coupled to said fast data storage to retrieve said at least one message therefrom;

(b) generating at least one message by said at least one Producer Processor Unit, said at least one message including a binary payload, and a predetermined layout of data storage devices identifying a predetermined number and location of data storage devices of said plurality of storage devices, and transmitting said at least one message to said at least one initiating node of said array of compute nodes;

(c) receiving said at least one message at said at least one initiating node;

(d) replicating said at least one message received at said at least one initiating node across said predetermined layout of data storage devices;

(e) assigning a logical clock timestamp to said at least one message, and publishing said at least one message in said fast data storage in a Bε-tree format; and (f) retrieving said at least one message, by said at least one Consumer Processor Unit coupled to said at least one target node, from said fast data storage.

2. The method of claim 1, further comprising:

subsequent to said step (e), transmitting a push notification indicating said at least one message availability in said fast data storage to said at least one Consumer Processor Unit coupled to said at least one target node; and subsequent to said step (f), transmitting an acknowledgement message from said at least one Consumer Processor Unit coupled to said at least one target node to said at least one initiating node.

3. The method of claim 1, wherein said each compute node includes, incorporated therein, a Storage Daemon (SD) Processor Unit and a Broker Processor Unit operatively coupled between said at least one Producer Processor Unit and said at least one Consumer Processor Unit, further comprising:

in said step (c), transmitting said at least message from said at least one Producer Processor Unit to said Broker Processor Unit incorporated in said at least one initiating node, and forwarding said at least one message from said Broker Processor Unit to said SD Processor Unit incorporated in said at least one initiating node;

in said step (d), replicating said at least one message across said predetermined layout of data storage devices by said SD Processor Unit; and in said step (f), delivering said at least one message, by said Broker Processor Unit of said at least one initiating node, from said fast data storage to said at least one Consumer Processor Unit coupled to said at least one target node.

4. The method of claim 1, further comprising:

running each of said at least one Producer Processor Unit and said at least one Consumer Processor Unit within said at least one cluster of compute nodes.

5. The method of claim 2, further comprising:

in said step (a), defining said at least one Client Processor Unit with at least a first client node and at least a second client node, operatively coupling said at least first client node to said at least one initiating node, and operatively coupling said at least one second client node to said at least one target node; and running said at least one Producer Processor Unit on said at least one first client node, and running said at least one Consumer Processor Unit on said at least one second client node.

6. The method of claim 2, wherein said fast data storage is a queue of partially ordered messages, further comprising:

in said step (f), retrieving said at least one message from said queue according to a delivery guarantee.

7. The method of claim 6, further comprising:

subsequent to said step (e), transmitting said acknowledgement message to acknowledge said logical clock timestamp of said at least one message upon delivery thereof to said at least one Consumer Processor Unit coupled to said at least one target node.

8. The method of claim 7, further comprising:

in said step (e), assigning said logical clock timestamp, by said Broker Processor Unit, to said at least one message when said at least one message is published in said queue, and in said step (f), delivering said at least one message from said queue to said at least one Consumer Processor Unit coupled to said at least one target node subsequent to delivering messages contained in said queue having logical clock timestamps preceding said logical clock timestamp of said at least one message which has been acknowledged.

9. The method of claim 6, further comprising:

prior to said step (b), creating said queue by said at least one first client node, and assigning to said queue a queue deadline attribute, wherein said at least one message is active until being published in said queue for longer than a duration of said queue deadline attribute.

10. The method of claim 6, further comprising:

embedding at least one first interface in said at least one initiating node and at least one second interface in said at least one target node, connecting said at least one first interface and said at least one second interface through a respective at least one communication channel of said plurality of communication channels supporting a Remote Direct Memory Access (RDMA)—based networking, and prior to step (f), registering said at least one Consumer Processor Unit to said queue.

11. The method of claim 10, wherein said at least one first interface and said at least one second interface include at least one interface selected from a group consisting of: (a) an interface configured to provide access to said queue, (b) an interface configured as a library to provide function-call entry points, (c) an interface configured to provide access to the queue via a Linux FUSE file system, and (d) a combination thereof.

12. The method of claim 6, wherein said delivery guarantee includes delivering at least one acknowledgement message from said at least one Consumer Processor Unit registered to said queue that is active during the duration of said at least one message being alive.

13. The method of claim 7, wherein said at least one message is considered to be delivered when an acknowledgement message transmitted subsequent to said step (f) from said at least one Consumer Processor Unit coupled to said at least one target node is received at said at least one initiating node.

14. The method of claim 6, further comprising:

closing the registration to said queue of said Consumer Processor Unit upon processing of said at least one message by said at least one Consumer Processor Unit and confirming the receipt of said at least message with said acknowledgement message.

15. The message of claim 13, further comprising:

defining a retention time for said queue at said queue creation, subsequent to said step (f), deleting said message upon reaching a certain age corresponding to said retention time for said queue, and deleting said queue.

16. The method of claim 10, further comprising:

prior to said step (f), registering a Consumer group of a plurality of said at least one Consumer Processor Units to said queue, wherein said Consumer group if active when said at least one Consumer Processor Unit is active.

17. A system for migrating data in a distributed data storage system, comprising:

an array of compute nodes arranged in at least one cluster of compute nodes, said array of compute nodes having at least one initiating node for sending at least one message and at least one target node for receiving said at least one message from said at least one initiating node, said at least one message including a binary payload and a predetermined layout of data storage devices, a plurality of communication channels supporting a Remote Direct Memory Access (RDMA)—based networking for interconnecting said compute nodes in said array of compute nodes, a messaging sub-system embedded in said at least one cluster in operative coupling with and distributed among said compute nodes of said array of compute nodes, and a plurality of storage devices, wherein each compute node of said array of compute node has an exclusive access to said predetermined layout of data storage devices of said plurality of data storage devices;

wherein said messaging sub-system includes:

at least one Producer Processor Unit configured to generate and publish said at least one message to a queue of messages, at least one Consumer Processor Unit operatively coupled to said queue of messages to retrieve said at least message therefrom, and wherein said each compute node includes, incorporated therein, a Storage Daemon (SD) Processor Unit and a Broker Processor Unit operatively coupled between said at least one Producer Processor Unit and said at least one Consumer Processor Unit;

said at least one Producer Processor Unit being further configured to forward said at least one message to said Broker Processor Unit of said at least one initiating node, said Broker Processor Unit being configured to forward said at least one message to said SD Processor Unit of said at least one initiating node, and said SD Processor Unit being configured to replicate said at least one message across said predetermined layout of data storage devices, and to assign a logical clock timestamp to said at least one message, to publish said at least one message in said queue of messages in a Bε-tree format, and to issue a push notification indicating said at least one message availability to said at least one Consumer Processor Unit of said at least one target node;

wherein said Broker Processor Unit of said at least one initiating compute node is further configured to deliver said at least one message from said queue of messages to said at least one Consumer Processor Unit of said at least one target node, and wherein said at least one Consumer Processor Unit of said at least one target node is further configured to issue at least one acknowledgement message upon receipt and processing of said at least one message from said queue of messages, and wherein said at least one message is considered to be delivered to said at least one Consumer Processor Unit of said at least one target node when said at least one acknowledgement message is received at said at least one Broker Processor Unit.

18. The system of claim 17, wherein said at least one Producer Processor Unit and said at least one Consumer Processor Unit run within said at least one cluster of compute nodes.

19. The system of claim 17, further comprising:

at least one first client node operatively coupled to said at least one Producer Processor Unit, and at least one second client node operatively coupled to said at least one Consumer Processor Unit of said at least one target node, wherein said at least one Producer Processor Unit runs on said at least one first client node, and said at least one Consumer Processor Unit of said at least one target node runs on said at least one second client node.

20. The system of claim 17, further comprising at least one first interface embedded in said at least one initiating node and at least one second interface embedded in said at least one target node, wherein said at least one first interface and said at least one second interface are coupled by a respective at least one communicating channel of said plurality of communication channels supporting a Remote Direct Memory Access (RDMA)—based networking, wherein said at least one Consumer Processor Unit is registered to said queue of messages, wherein said at least one message is retrieved from said queue of messages to said at least one Consumer Processor Unit operatively coupled to said at least one target node, and wherein said at least one first interface and said at least one second interface include at least one interface selected from a group consisting of: an interface configured to provide access to said queue of messages, an interface configured as a library to provide function-call entry points, and an interface configured to provide access to said queue of messages via a Linux FUSE file system.

* * * * *